(12) United States Patent
Pais et al.

(10) Patent No.: US 7,786,633 B2
(45) Date of Patent: Aug. 31, 2010

(54) ELECTRIC MOTOR WITH A RETRACTABLE SHAFT

(75) Inventors: Martin R. Pais, North Barrington, IL (US); Shumin Cheng, Vernon Hills, IL (US); Detlef Schmidt, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 138 days.

(21) Appl. No.: 11/956,526

(22) Filed: Dec. 14, 2007

(65) Prior Publication Data

US 2008/0157702 A1 Jul. 3, 2008

Related U.S. Application Data

(60) Provisional application No. 60/882,042, filed on Dec. 27, 2006.

(51) Int. Cl.
*H02K 7/06* (2006.01)
*H02K 7/10* (2006.01)
(52) U.S. Cl. .......................... 310/81; 310/17
(58) Field of Classification Search ............ 310/17, 310/80, 81
See application file for complete search history.

(56) References Cited

U.S. PATENT DOCUMENTS

| 4,381,747 A | 5/1983 | Kobayashi et al. |
| 4,453,515 A | 6/1984 | Saji et al. |
| 4,515,027 A | 5/1985 | Baier et al. |
| 4,956,078 A | 9/1990 | Magerowski et al. |
| 5,439,314 A | 8/1995 | Wadensten |
| 6,116,428 A | 9/2000 | Loshe |
| 7,084,535 B2 | 8/2006 | Holman, IV et al. |
| 7,136,688 B2 * | 11/2006 | Jung et al. ............ 455/575.4 |
| 2003/0228881 A1 | 12/2003 | Yamamoto et al. |
| 2005/0181326 A1 | 8/2005 | Maitre |
| 2006/0105817 A1 | 5/2006 | Naick et al. |

* cited by examiner

*Primary Examiner*—Javaid Nasri

(57) ABSTRACT

An electric motor (100) for controlling the lateral displacement of a shaft (114) connected to a rotor (104) of the electric motor (100) is provided. The electric motor (100) includes one or more stator conductors (106) for carrying a current and one or more permanent magnets (108) to produce a magnetic field (504). The one or more stator conductors (106) interact with the magnetic field (504) when the power is applied, to purposely generate a force with an axial (Fa) and a circumferential component (Fc). The electric motor (100) includes the shaft (114) that travels along a rotor axis (506) in an axial direction when the power is applied, under an action of the axial component of the force. However, when the power is removed, the shaft (114) retracts under the action of a biasing force from a tension device (118).

19 Claims, 11 Drawing Sheets

ELECTRIC MOTOR WITH A RETRACTABLE SHAFT

FIELD OF THE INVENTION

The present invention generally relates to an electric motor, and more specifically, to an electric motor with a retractable shaft.

BACKGROUND OF THE INVENTION

A typical electric motor includes a stator and a rotor. The stator is the stationary section of the electric motor, whereas the rotor is its rotating section. The rotor typically provides a rotational motion to a load connected to it.

In at least one known application of the electric motor, it is used as part of a vibrator assembly. In a vibrator assembly, the rotor of the electric motor has an unbalanced cantilevered mass connected to the rotor of the electric motor through a shaft. The vibrator assembly is often used in devices, to provide haptic feedback to the user with a vibratory force. Currently, many electronic devices, for example, many mobile phones and pagers, utilize the vibrator assembly to produce vibration for at least some forms of a call alert. The electric motor gets energized and the unbalanced mass attached to it starts rotating as soon as the motor detects a signal associated with an incoming call, which provides a vibratory motion to the electronic device. When being rotated, the mass is often extended away from the body of the motor along the length of the shaft in a cantilevered configuration in order to minimize any friction and/or interference between the motor and the mass.

However, in certain situations, when the electronic device is dropped accidentally, there is a risk of the shaft being bent due to the weight and the extended position of the cantilevered mass attached to it. In a still worse scenario, the shaft can be completely disconnected from the electric motor or the weight may get knocked off from the shaft, thereby damaging the electronic device and/or affecting the device's ability to produce future vibrational forces.

In an attempt to avoid the above noted bending or deformation, some designs have attempted to use a high-grade material with a higher tensile strength from which the shaft is manufactured. However, various tests conducted on shafts composed of different materials have shown that the shafts composed of lower tensile strength materials generally have a higher fracture resilience than the shafts composed of higher tensile strength materials under at least some conditions of impact. In other words, while some harder materials had a greater resistance to bending, they often showed a greater propensity to crack or break under the same circumstances. Furthermore, it has also been demonstrated that under at least some expected usage conditions that even many of the higher-grade materials including at least some higher tensile strength steels still may not be able to withstand the maximum anticipated stresses likely to be encountered when the device is dropped. Moreover, a higher-grade material can also increase the cost of the shaft and consequently the cost of the electric motor.

In light of the above-mentioned facts, there exists a need for a method and system for preventing and or reducing the possibility of the shaft of an electric motor from getting damaged or bent in the event an electronic device comprising the electric motor is dropped.

SUMMARY OF THE INVENTION

In at least one embodiment of the present invention, an electric motor for use in a device is provided. The electric motor includes a stator, a rotor, and a shaft connected to the rotor. The stator includes one or more stator conductors to carry the current when power is applied. The rotor includes one or more magnets to produce a magnetic field. When power is applied, the one or more stator conductors interact with the magnetic field to purposely generate a force with an axial and a circumferential component. Due to the action of the axial component of the force, the shaft travels along a rotor axis in an axial direction from a rest position. When the power is removed, the axial component of the force is no longer present. Therefore, the shaft retracts under the action of the biasing force provided by a tension device.

In another embodiment of the present invention, a vibrator assembly is provided. The vibrator assembly includes a motor. The motor includes a stator, a rotor, a shaft connected to the rotor, and an unbalanced mass coupled to the shaft. The stator includes one or more stator conductors to carry current when power is applied. The rotor includes one or more magnets to produce a magnetic field. When power is applied, the one or more stator conductors interact with the magnetic field to produce a force with an axial and a circumferential component. Due to the axial component of the force, the shaft travels along a rotor axis in an axial direction. Further, the shaft rotates under the action of the circumferential component of the force. Moreover, when power is removed, and the axial component of the force is no longer present, the shaft retracts under the action of a biasing force from a tension device. The unbalanced mass rotates under the action of the circumferential component of the force on the rotor when power is applied.

In a another embodiment of the present invention, a method for controlling lateral positioning of a shaft within an electric motor during the operation of the electric motor is provided. The electric motor includes a stator, a rotor and a shaft connected to the rotor. The rotor is biased in an axial direction towards a parked position by means of a tension device. When power is applied to the electric motor, the magnetic field produced by one or more magnets of the stator interact with one or more current-carrying stator conductors, thereby purposely generating a force with an axial and a circumferential component. The axial component of the purposely-generated force extends the shaft in an axial direction against the biasing force provided by the tension device.

These and other features, as well as the advantages of this invention, are evident from the following description of one or more embodiments of this invention, with reference to the accompanying figures.

BRIEF DESCRIPTION OF THE FIGURES

The present invention is illustrated by way of example, and not limitation, in the accompanying figures, in which like references indicate similar elements, and in which.

Figure 1:
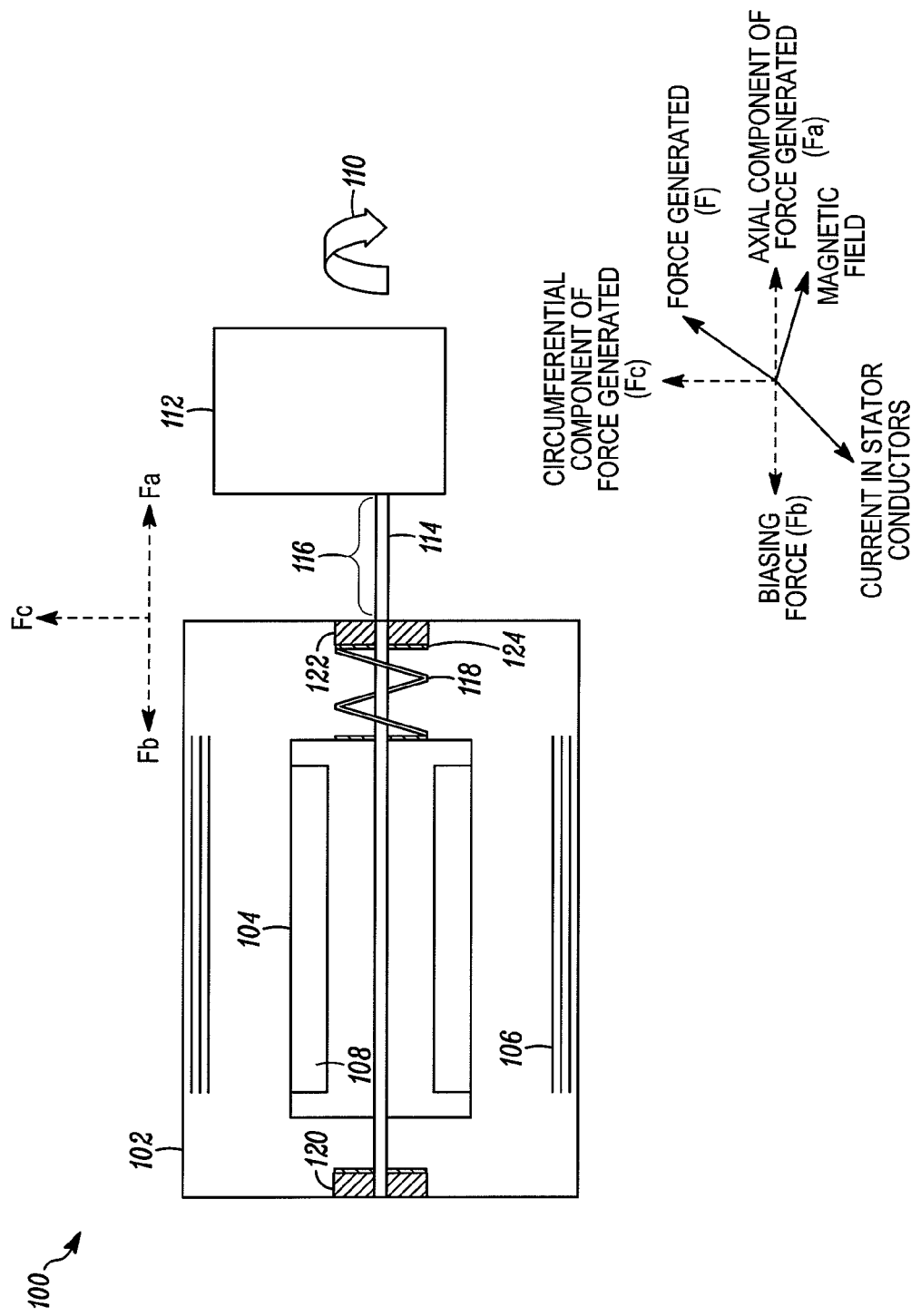
FIG. 1 illustrates an exemplary electric motor when power is applied to the electric motor, in accordance with at least one embodiment of the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of embodiments of the present invention.

DETAILED DESCRIPTION

Before describing in detail the particular electric motor, in accordance with various embodiments of the present invention, it should be observed that the present invention resides primarily in combinations of the apparatus components of the electric motor, related to lateral displacement of the shaft within the electric motor. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, relational terms such as 'first' and 'second', and the like, may be used solely to distinguish one entity from another entity, without necessarily requiring or implying any actual such relationship or order between such entities. The terms "comprises," "comprising," or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by "comprises . . . a" does not, without more constraints, preclude the existence of additional identical elements in the process, method, article or apparatus that comprises the element. The term 'another', as used herein, is defined as at least a second or more. The term 'including' as used herein, is defined as comprising.

FIG. 1 illustrates an exemplary electric motor 100 when power is applied to the electric motor 100, in accordance with at least one embodiment of the present invention. The electric motor 100 is housed in a motor-housing 102. Examples of the electric motor 100 can include, but are not limited to, a Permanent Magnet Direct Current (PMDC) motor and a Switched Reluctance Motor (SRM). The electric motor 100 includes a stator and a rotor 104. The stator is an external section of the electric motor 100 and is stationary. The stator can include one or more stator conductors for carrying current, for example, a current-carrying stator conductor 106. The rotor 104 is the rotating section of the electric motor 100 and includes one or more permanent magnets 108 for producing a magnetic field.

When power is applied to the electric motor 100, current flows in the one or more stator conductors 106. The current-carrying stator conductors 106 interact with the magnetic field produced by the one or more permanent magnets 108 to purposely generate a force known as the Lorentz Force. According to the Lorentz Force law, when a magnetic field is applied, perpendicular to a current-carrying conductor, a force is generated that is perpendicular to the current-carrying conductor and the magnetic field. The generated force is typically purely circumferential.

However, when a vector direction of the magnetic field is aligned at an angle other than 90 degrees, relative to the axial direction of the current-carrying stator conductor 106, the force generated is not purely circumferential. Instead, the purposely-generated force has an axial as well as a circumferential component. In at least one embodiment of the present invention, the one or more current-carrying stator conductors 106 are not aligned at an angle of 90 degrees to the vector direction of the magnetic field, but are skewed, relative to the rotor axis. An exemplary embodiment incorporating such an arrangement is illustrated and explained in conjunction with FIG. 5.

In another embodiment of the present invention, the vector direction of the magnetic field is not perpendicular to the stator conductors 106, but is skewed, relative to the radial and axial direction of the rotor 104. It will be apparent to one ordinarily skilled in the art that the radial direction of the rotor 104 can be represented by a vector that is perpendicular to the axis of the rotor. An exemplary embodiment in accordance with this further embodiment is illustrated and explained in conjunction with FIG. 6. In a still further embodiment of the present invention, the one or more current-carrying stator conductors 106 are skewed, relative to the axis of the rotor 104, and the vector direction of the magnetic field is skewed, relative to the radial direction of the rotor 104. An example of the still further embodiment is illustrated and explained in conjunction with FIG. 7.

When the magnetic field is aligned at an angle other than 90 degrees to the one or more current-carrying stator conductors 106, the generated force has a purposeful axial component (Fa) in addition to the circumferential component (Fc). The circumferential component of the force rotates the rotor 104 in a direction 110. The axial component of the force moves the rotor 104 in an axial direction. The axial component of the force so generated can be utilized to move a load 112 attached to the rotor 104 in an axial direction.

The load 112 can be attached to the electric motor 100 through a shaft 114, which is coupled to the rotor 104. In at least one embodiment of the present invention, the rotor 104 and the shaft 114 can be cast in a single piece. Initially, the shaft 114 is at a rest position when power is not applied to the electric motor 100. When power is applied to the electric motor 100, the shaft 114 travels along a rotor axis in an axial direction under the influence of the axial component of force (Fa). The load 112 travels with the shaft 114 in the axial direction.

In at least one embodiment of the present invention, the load 112 can be an unbalanced mass. This unbalanced mass travels with the shaft 114 due to the axial component of the force, when power is applied to the electric motor 100. Further, the unbalanced mass rotates with the rotor and the shaft due to the circumferential component of the force. The rotation of the unbalanced mass can produce vibration in the device.

When power is removed from the electric motor 100, the shaft 114 retracts due to a biasing force (Fb). The biasing force can be provided by a tension device. In the illustrated embodiment, the tension device can be a spring 118. Examples of the spring 118 can be a helical spring and a leaf spring. It will be apparent to a person ordinarily skilled in the art that any device that is capable of providing a biasing force can be used as a tension device.

Figure 3:
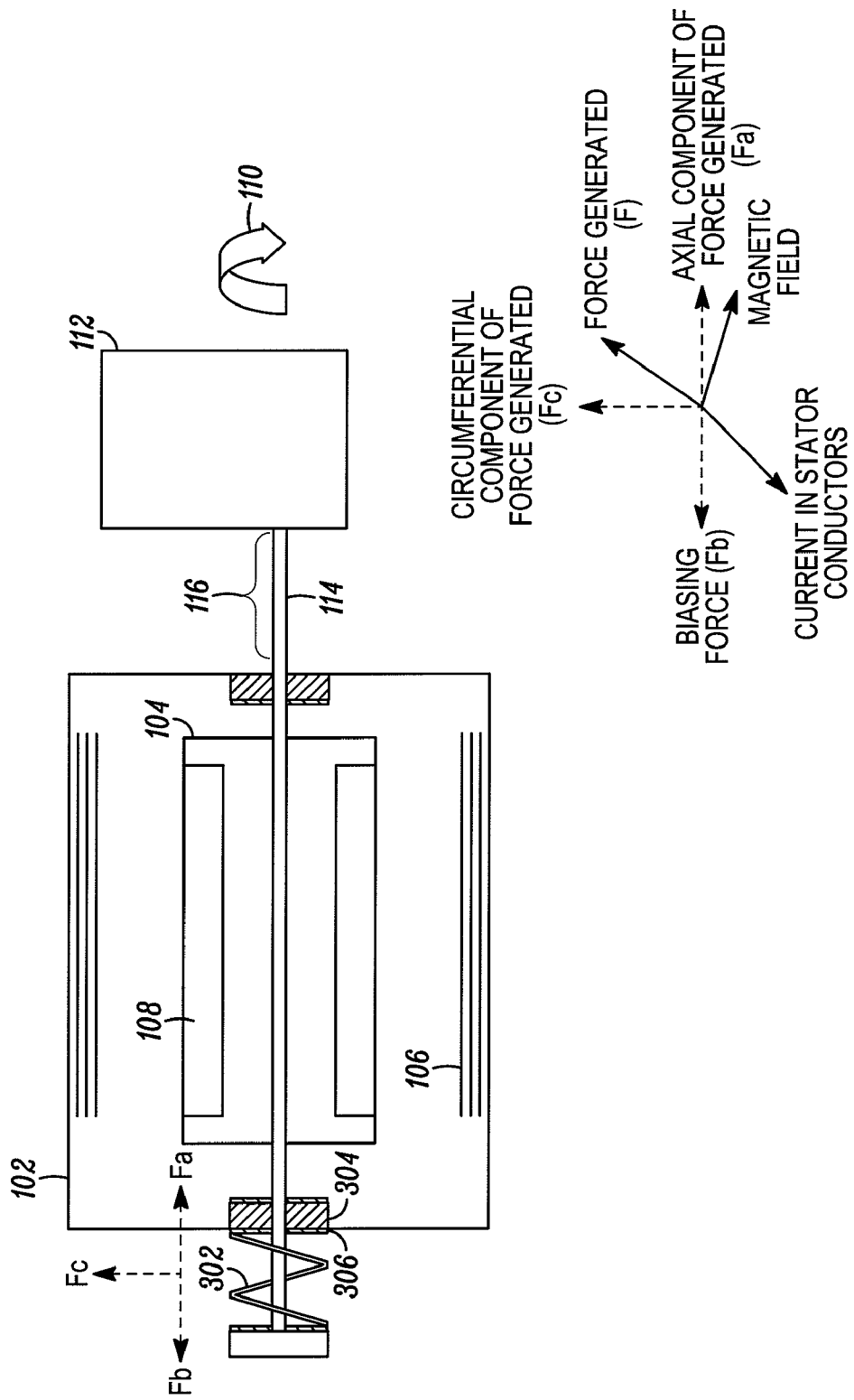
FIG. 3 illustrates an exemplary electric motor when power is applied thereto, in accordance with another embodiment of the present invention.
Figure 4:
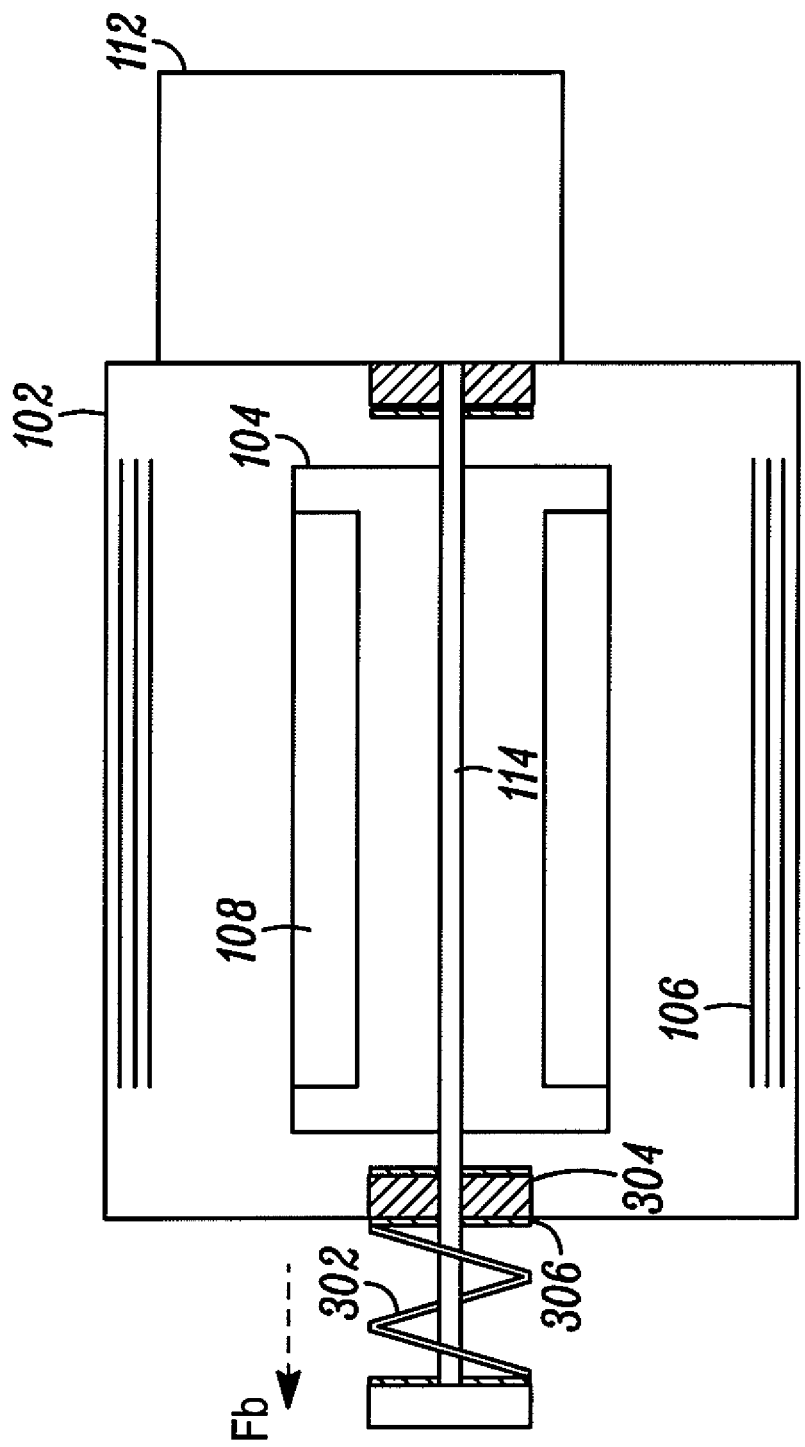
FIG. 4 illustrates an exemplary electric motor when power is removed therefrom, in accordance with another embodiment of the present invention.

In the illustrated embodiment, the spring 118 is located co-axially with the shaft 114 between the rotor 104 and the motor-housing 102. In another embodiment of the present invention, the spring can be located co-axially with the shaft 114 on the exterior and opposite end of the electric motor 100, relative to the load 112 between the end of the shaft 114 and the motor-housing 102. In the illustrated embodiment, the spring is in a more compressed state when power is applied, as shown in FIG. 3. Further, when the power is removed, the spring biases the shaft and the attached mass toward a less compressed state, as illustrated in FIG. 4.

The electric motor 100 can also include a bearing arrangement, which can be adapted to support the travel of the shaft 114 in the axial direction, as well as the circumferential direction. The bearing arrangement can include one or more bearings, for example, a bearing 120 and a bearing 122. Examples of the one or more bearings include, but are not limited to, a ball bearing, a roller-thrust bearing, a ball-thrust bearing, and a tapered roller-thrust bearing. In the illustrated embodiment, the bearing 122 is located proximate the spring 118 through one or more spacers, such as spacer 124. The spacer 124 in many instances represents an intermediate element, which can be used to reduce friction between elements. In at least some instances the spacer can include one or more fiber washers having a lubricant applied thereto. In some instances, the width of the spacer can also be used to adjust the relative spacing of elements and account for certain tolerances during manufacture, as well as ensure proper positioning of the stator relative to the rotor during instances in which power is alternatively applied and/or is removed. The spring 118, the bearing 122 and the spacer 124 can be coaxially located in the electric motor 100.

Figure 2:
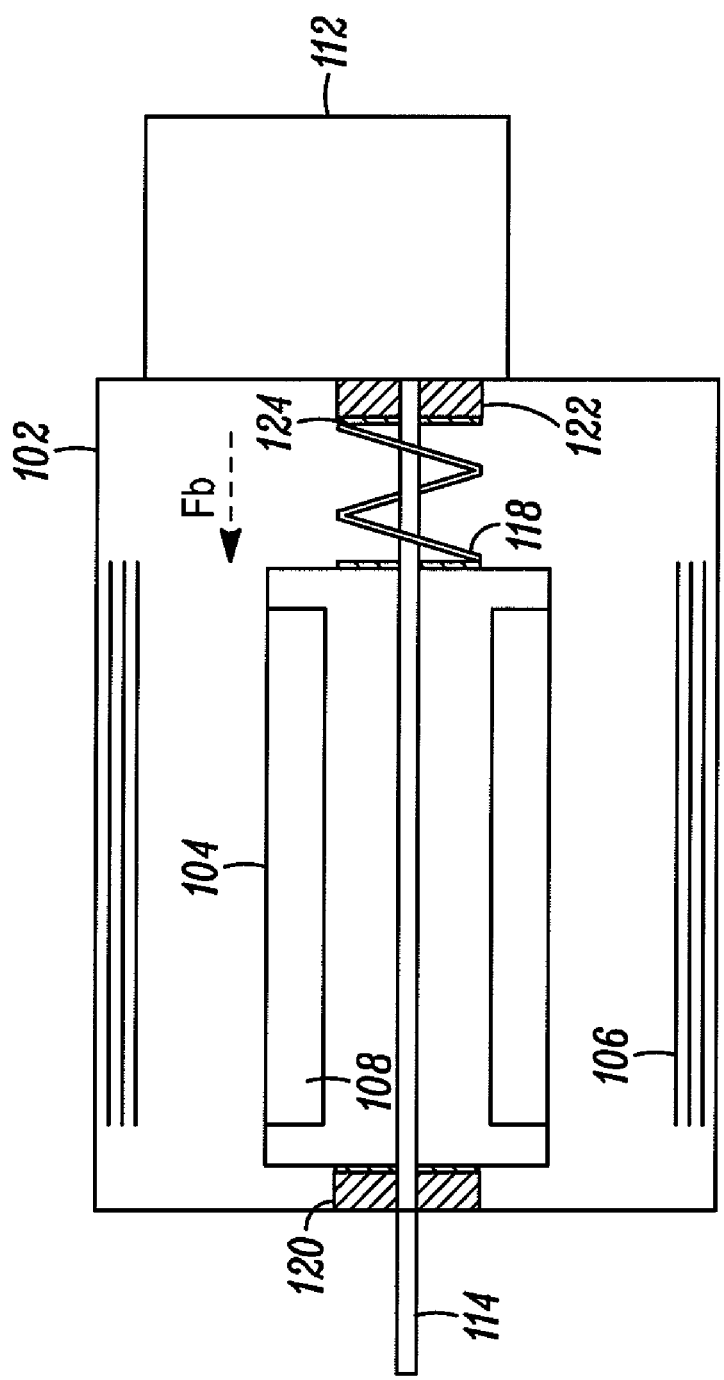
FIG. 2 illustrates an exemplary electric motor when power is removed therefrom, in accordance with at least one embodiment of the present invention.

FIG. 2 illustrates an exemplary electric motor 100 when power is removed from the electric motor 100, in accordance with at least one embodiment of the present invention. When power is removed from the electric motor 100, the current in the one or more stator conductors 106 is no longer present. Therefore, the purposely-generated force resulting from the interaction of a current through the conductor and the magnetic field including the circumferential and the axial component of the force dissipates. In turn, the shaft 114 retracts to a parked position due to the biasing force of the tension device. In at least one embodiment of the present invention, the tension device is a spring 118. The spring 118 is in a more compressed state as a result of the portion of the force corresponding to the axial component, when power is applied, as illustrated in FIG. 1. However, when the power is removed, the spring 118 is allowed to return to a less compressed state. Therefore, the spring 118 will generally bias the load 112 towards the motor-housing 102, and a parked position relative to the motor-housing 102, in absence of an application of any countervailing forces.

In at least one embodiment of the present invention, the spring 118 can be located co-axially with the shaft 114 between the rotor 104 and the motor-housing 102, as shown in FIG. 1 and FIG. 2. In another embodiment of the present invention, the spring can be located co-axially with the shaft 114, on the exterior and opposite ends of the electric motor 100, relative to the load 112 between the end of the shaft 114 and the motor-housing 102, as shown in FIG. 3 and FIG. 4.

FIG. 3 illustrates an exemplary electric motor 100 when power is applied to the electric motor 100, in accordance with another embodiment of the present invention. The electric motor 100 includes the load 112 that is coupled to the rotor 104 of the electric motor 100 through the shaft 114. When the power is not applied, the load 112 is biased towards the motor-housing 102 due to a tension device, for example, a spring 302. In the illustrated embodiment, the spring 302 can be located co-axially with the shaft 114 on the exterior and opposite end of the electric motor 100, relative to the load 112 between the end of the shaft 114 and the motor-housing 102. Moreover, the spring 302 can also be located proximate to one or more bearings, for example, a bearing 304, through one or more spacers, for example, a spacer 306. The spacer 306 can help ensure proper positioning of the various elements such as the rotor 104 and the motor housing 102. The spring 302, the bearing 304, and the spacer 306 can be coaxially located in the electric motor 100.

When power is applied, a force is generated due to the interaction of the current-carrying stator conductor 106 with a magnetic field produced by one or more permanent magnets 108. The generated force has an axial and a circumferential component. The axial component of the generated force can push the shaft 114 in an axial direction against the biasing force of the spring 302, and correspondingly the mass 112 attached proximate the end of the shaft toward a position that is a safe distance away from the motor housing 102 in order to allow for a more unobstructed rotation of the mass 112.

FIG. 4 illustrates an exemplary electric motor 100 when power is removed from the electric motor 100, in accordance with another embodiment of the present invention. When the power is removed, the current in the stator conductors 106 is reduced to zero. As a result, the force which is generated due to the interaction of the current-carrying stator conductor 106 and the magnetic field is similarly dissipated. In the absence of the generated force, the load 112 attached to the electric motor 100 is allowed to retract due to a biasing force of the spring 302 toward a parked position. The parked position helps to reduce the amount of bending moment produced by the mass on the shaft, in the event that the motor with the attached mass were to be dropped. The retraction of the shaft serves to move the mass closer to the bearing supports, which in turn reduces the amount of torque produced by the mass, when an externally applied jarring force, such as the kind of force felt from impacting a relatively unyielding and/or static surface felt after a fall.

Figure 5:
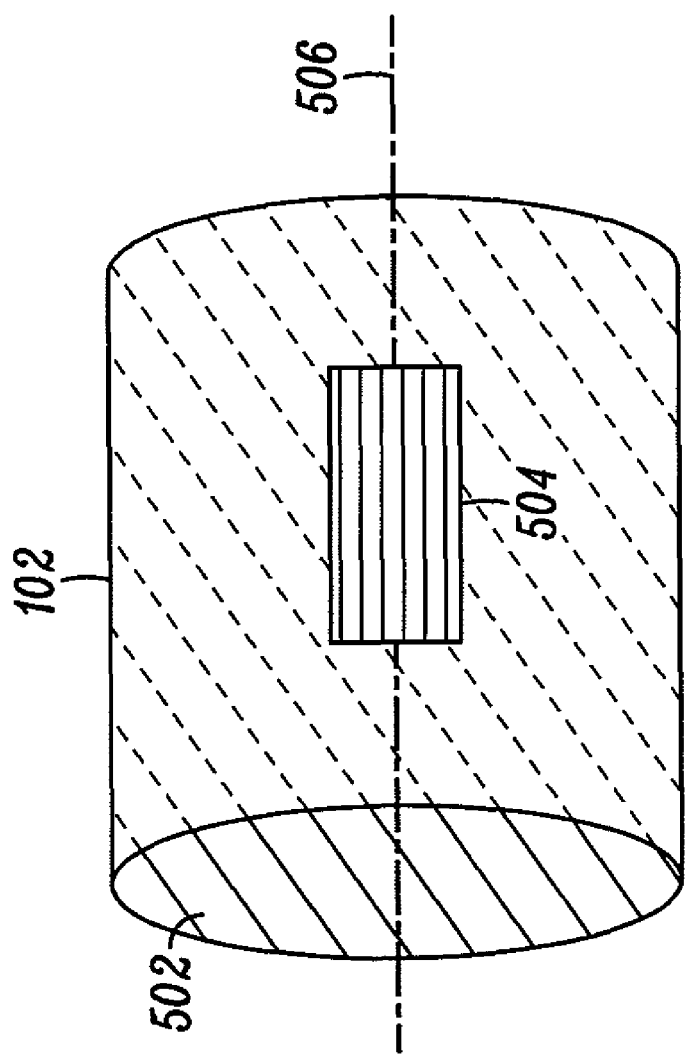
FIG. 5 illustrates an exemplary electric motor showing the relative arrangement and interaction of one or more stator conductors with a magnetic field in the electric motor, in accordance with at least one embodiment of the present invention.

FIG. 5 illustrates an exemplary electric motor 100, showing the interaction of one or more stator conductors 502 with a magnetic field 504 in the electric motor 100, in accordance with at least one embodiment of the present invention. The electric motor 100 includes the one or more stator conductors 502 and one or more permanent magnets 108 for producing the magnetic field 504. In at least one embodiment of the present invention, the one or more stator conductors 502 are skewed, relative to a rotor axis 506. The vector direction of the magnetic field 504 produced by the one or more permanent magnets 108 can be parallel, relative to the radial direction of the rotor 104. Since the current-carrying stator conductors 502 are skewed, relative to the rotor axis 506, the interaction of the magnetic field 504 with the current-carrying stator conductors 502 generates a force having a more than trivial and/or incidental axial component in addition to the more traditional circumferential component. The axial component of the generated force pushes the shaft 114 along the rotor axis 506 away from the parked position.

Figure 6:
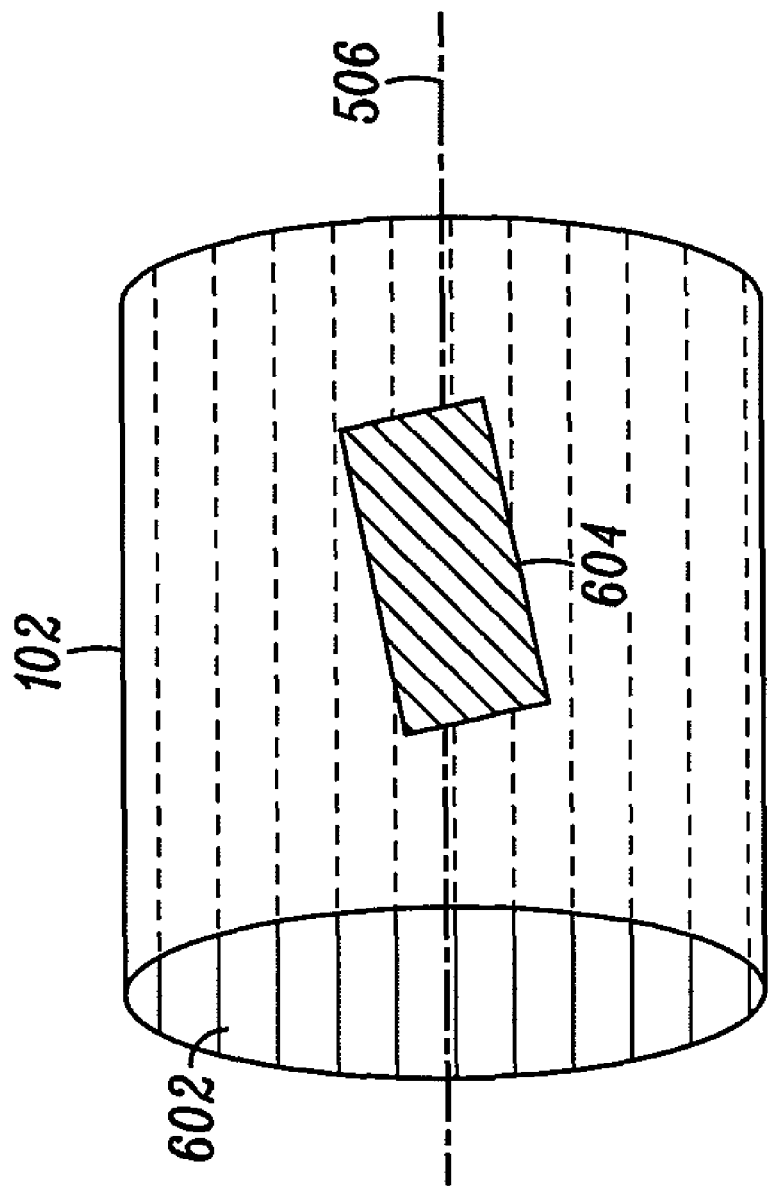
FIG. 6 illustrates an exemplary electric motor showing the relative arrangement and interaction of one or more stator conductors with a magnetic field in the electric motor, in accordance with another embodiment of the present invention.

FIG. 6 illustrates an exemplary electric motor 100, showing the interaction of the one or more stator conductors 602 with a magnetic field 604 in the electric motor 100, in accordance with another embodiment of the present invention. In the illustrated embodiment, the one or more stator conductors 106 are parallel to the rotor axis 506. Alternatively, the vector direction of the magnetic field 604 produced by the one or more permanent magnets 108 is skewed, relative to the radial and axial direction of the rotor 104. Since the vector direction of the current in the stator conductors 602 is aligned at an angle other than 90 degrees to the vector direction of the magnetic field 604 produced by the permanent magnets 108, a force is similarly generated having a more than incidental axial component in addition to the circumferential component. The axial component of the purposely-generated force similarly produces a movement of the rotor 104 in an axial direction.

Figure 7:
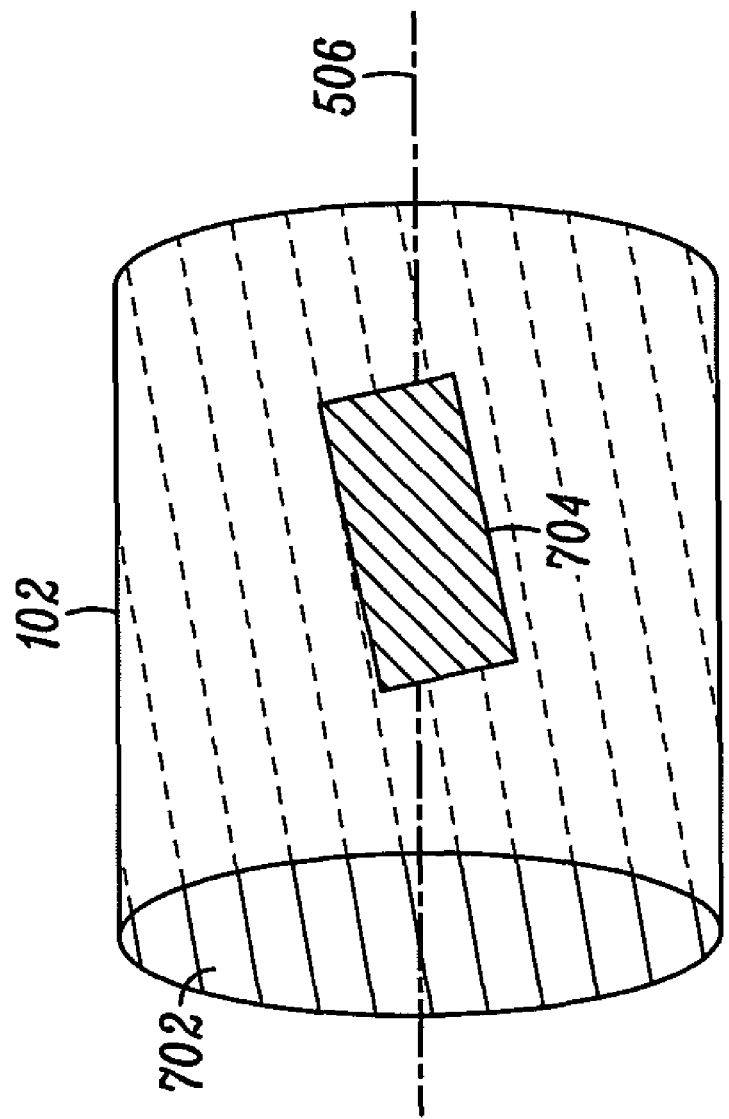
FIG. 7 illustrates an exemplary electric motor showing the relative arrangement and interaction of one or more stator conductors with a magnetic field in the electric motor, in accordance with yet another embodiment of the present invention.

FIG. 7 illustrates a still further exemplary electric motor 100, showing a still further potential interaction of one or more stator conductors 702 with a magnetic field 704 in the electric motor 100, in accordance with yet another embodiment of the present invention. In the present embodiment, the one or more stator conductors 702 are skewed, relative to the rotor axis 506. Further, the vector direction of the magnetic field 704 produced by one or more permanent magnets 108 is also skewed, relative to the radial and axial direction of the rotor 104. The interaction of the skewed one or more current-carrying stator conductors 702 with the skewed magnetic field 704 is similarly arranged such that it generates a force with an axial and a circumferential component. The axial component of the generated force biases the rotor and corresponding permanent magnets 108, and the shaft 114 and corresponding mass 112 along the rotor axis 506 away from a parked position.

Figure 8:
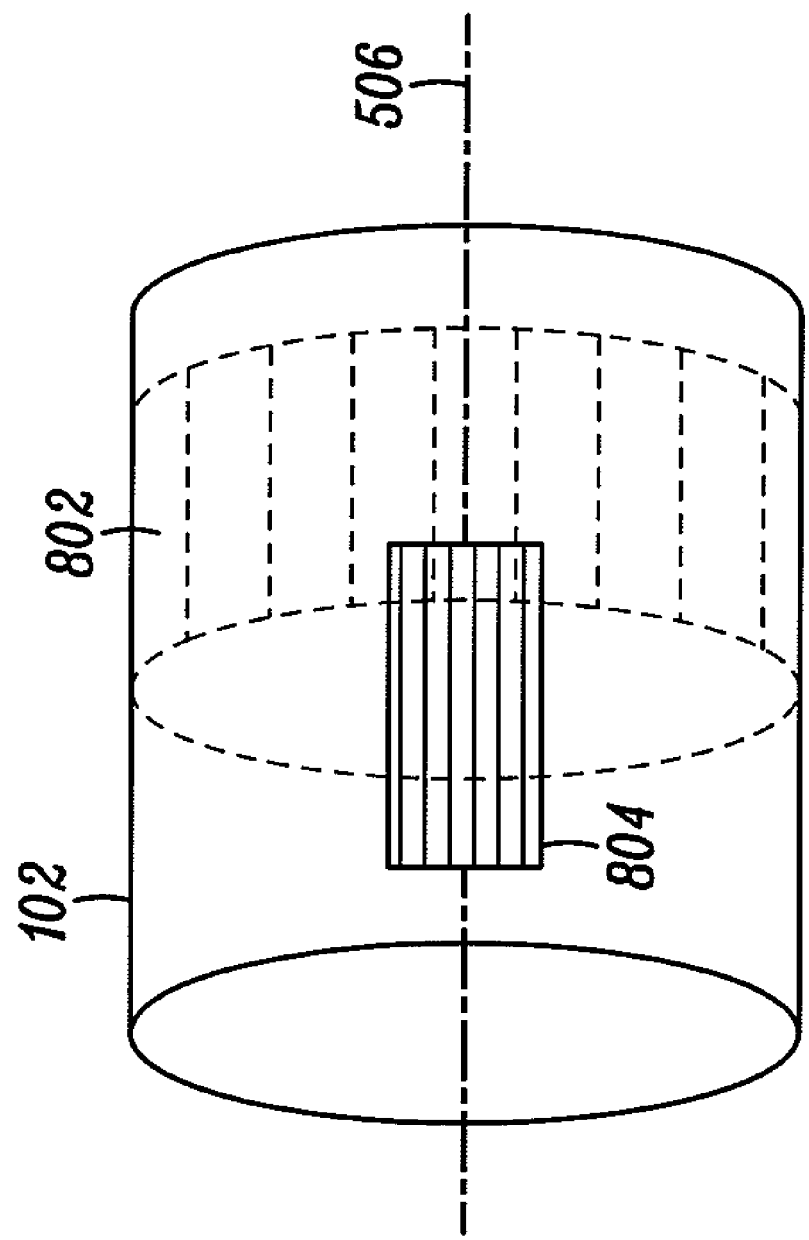
FIG. 8 illustrates an exemplary electric motor showing the relative arrangement and interaction of one or more stator conductors with a magnetic field in the electric motor, in accordance with yet a still further embodiment of the present invention.

FIG. 8 illustrates yet a still further exemplary electric motor 100, showing a still further potential interaction of one or more stator conductors 802 with a magnetic field induced by one or more magnets 804 in the electric motor 100. In the present embodiment, the one or more stator conductors 802 are axially offset, relative to one or more magnets 804 and the corresponding magnetic field. There is a tendency for a current carrying conductor to position itself within a magnetic field at the lowest potential point, which in the illustrated embodiment corresponds to the one or more current carrying stator conductors 802 being biased toward the center of the magnetic field 806. Such an alignment requires a relative axial shift between the one or more stator conductors 802 and the one or more magnets 804, when current is applied and sent through the stator conductors 802. The centering force is in addition to the circumferential force, which is similarly induced as a result of the interaction between the one or more current carrying conductors 802 and the magnetic field 804.

Figure 9B:
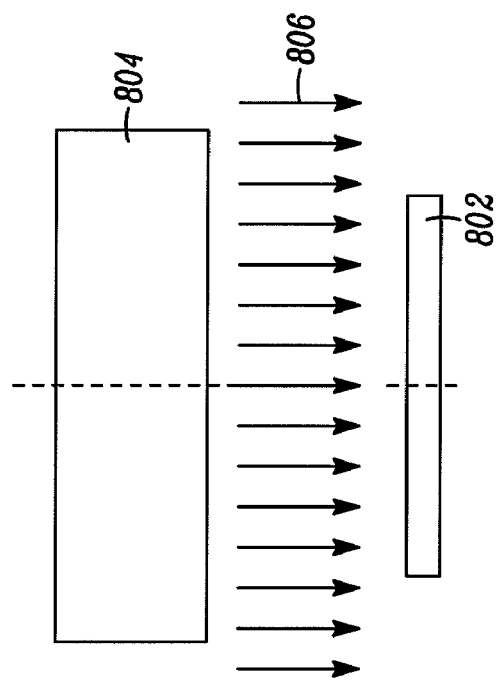
FIGS. 9A and 9B illustrate an exemplary relative arrangement and interaction between and corresponding alignment of the one or more stator conductors and the magnetic field produced by one or more magnets in the electric motor, in accordance with the exemplary electric motor illustrated in FIG. 8, when current is either present or not present in the one or more stator conductors.
Figure 9A:
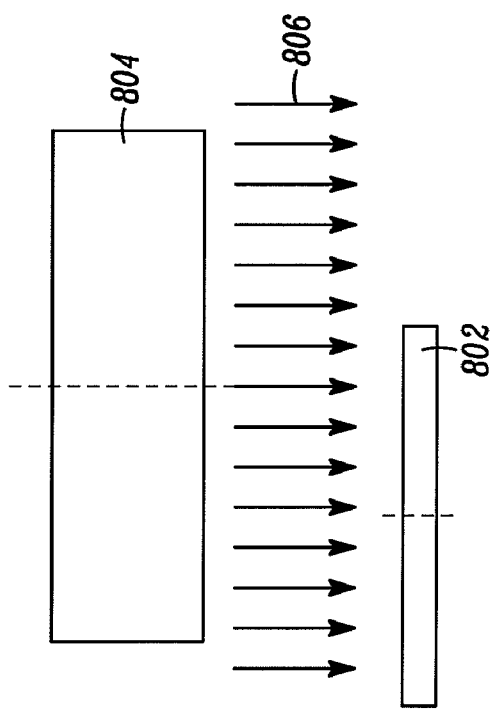

In at least a first instance when current is not applied and sent through the one or more stator conductors 802, as illustrated in FIG. 9A, the axial position of the one or more stator conductors 802 relative to the one or more magnets 804 is generally unbiased. In such an instance the relative axial position will be largely alternatively influence by other forces being applied to either of the one or more stator conductors 802 or the one or more magnets 804. At least one such potential source includes a spring 118 or 302 of the type illustrated in FIGS. 1-4, which can be arranged and positioned to bias the rotor relative to the stator in a parked and/or retracted position, when the rotor is not being rotated, and the centering force associated with a current carrying stator conductor 802 in a magnetic field 804 is not present.

In at least a further instance when current is applied and sent through the one or more stator conductors 802, as illustrated in FIG. 9B, the axial position of the one or more stator conductors 802 relative to the one or more magnets 804 is biased toward a more centered position, against the influence of any alternative sources, such as the above noted spring 118 or 302. Generally, the strength of the spring force associated with the spring 118 or 302 will be selected such that it is sufficient to bias the rotor toward a parked position in the absence of a countervailing force, but it is readily overcome by the centering force of the current carrying conductor 802 in the presence of the magnetic field 804. The resulting centering force generally biases the rotor and corresponding permanent magnets 108, along with the associated shaft 114 and corresponding mass 112 along the rotor axis 506 away from a parked position.

In this way the mass 112 can be positioned appropriately during the rotation of the same, a distance away from the motor housing 102 to limit the amount of any frictional interaction during times when the motor is actuated to produce a vibrational effect, and the mass can be parked more proximate the motor housing thereby limiting the overall distance 116 that the cantilevered mass 112 is positioned away from the point of support in the motor housing 102, during times when the motor is not producing a vibrational effect and may be the subject of a jarring force.

Figure 10:
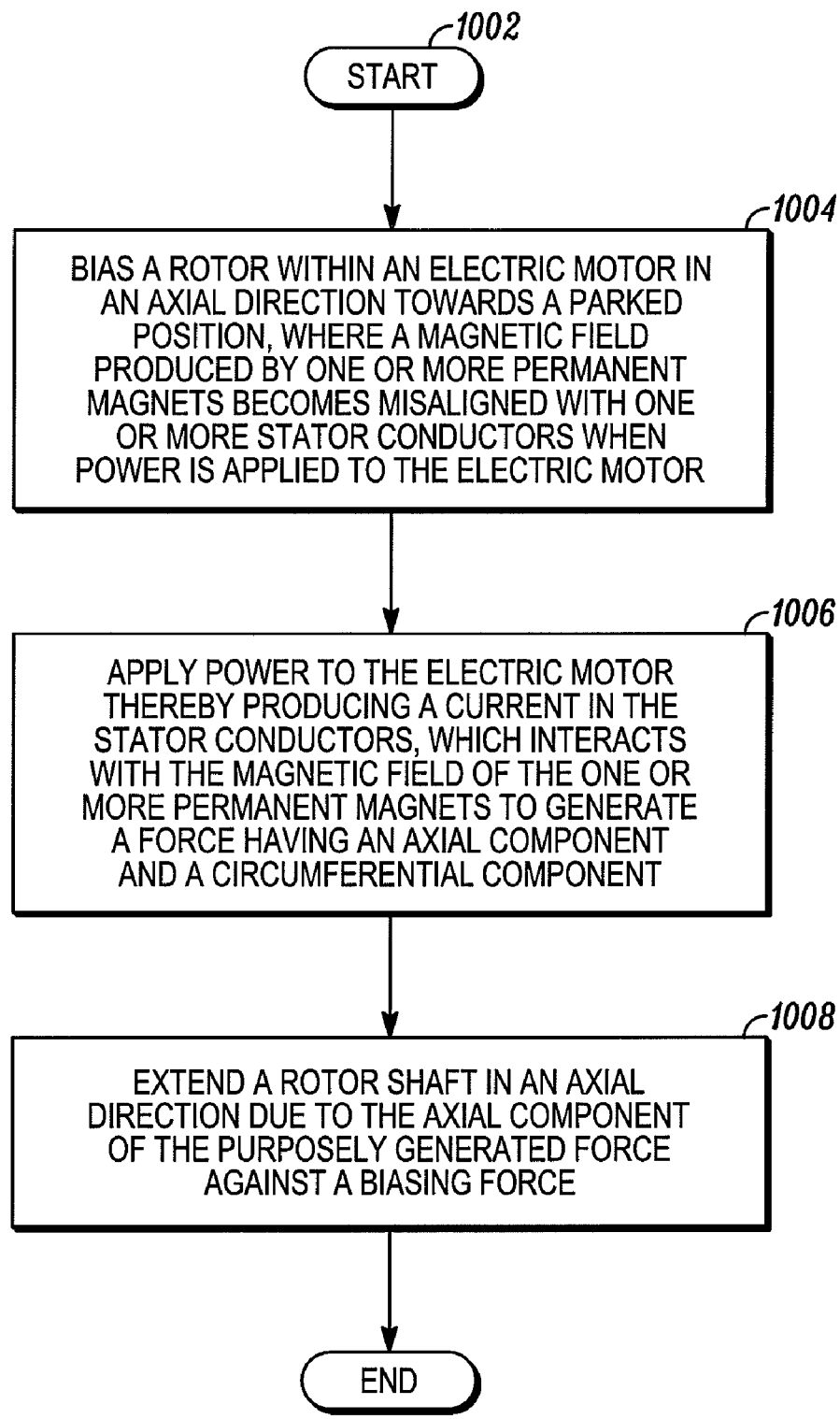
FIG. 10 is a flow diagram illustrating a method for controlling lateral positioning of a shaft within an electric motor during the operation of the electric motor, in accordance with various embodiments of the present invention.

FIG. 10 is a flow diagram illustrating a method 1002 for controlling lateral positioning of a shaft 114 within the electric motor 100 during the operation of the electric motor 100, in accordance with various embodiments of the present invention. Initially, the rotor 104 is biased 1004 within the electric motor 100 in an axial direction towards a parked position, when the power is not applied to the electric motor 100. In at least some instances, the rotor 104 is biased towards a parked position through a force applied through the use of a tension device. In at least some instances, the tension device can be the spring 118. Power is applied 1006 to the electric motor 100, producing a current in the one or more stator conductors 106. The current that is produced in the one or more stator conductors 106 interacts with the magnetic field 504 produced by the permanent magnets 108.

When power is applied to the electric motor 100, the current starts flowing in the one or more stator conductors 106. The one or more current-carrying stator conductors 106 interact with the magnetic field produced by the one or more permanent magnets 108, which is misaligned with one or more stator conductors 106. In at least some instances, the one or more stator conductors 106 can be skewed, relative to the rotor axis 506. In other instances, the current-carrying stator conductors 106 are parallel to the rotor axis 506, and the vector direction of the magnetic field generated by the permanent magnets 108 is skewed, relative to the radial and axial direction of the rotor 104. In yet another embodiment, the current-carrying stator conductors 106 are skewed, with respect to the rotor axis 506, and the vector direction of the magnetic field 504 generated by the permanent magnets 108 is skewed, relative to the radial and axial direction of the rotor 104.

A force is generated, based on the interaction of the current-carrying one or more stator conductors 106 with the magnetic field. The purposely-generated force has an axial component, apart from the circumferential component, since the one or more stator conductors 106 are not perpendicular to the magnetic field and/or are not centered relative to the magnetic field. Due to the axial component of force, the shaft 114 connected to the rotor 104 extends 1008 in an axial direction. Further, the shaft 114 rotates due to the circumferential component of the force. In at least one embodiment, the load 112 can be connected to the shaft 114. In at least some instances, the load is an unbalanced mass that can be connected to the shaft 114, so that the rotation of the unbalanced mass produces a vibration, and correspondingly produces a vibration relative to any structure to which the motor is attached, like a device. When the power is removed from the electric motor 100, the axial component of the force dissipates with the dissipation of the current through the one or more stator conductors. The shaft 114 then retracts towards the parked position in the axial direction due to the biasing force of the tension device, which is no longer being opposed by an opposing force having a purposeful axial component.

Figure 11:
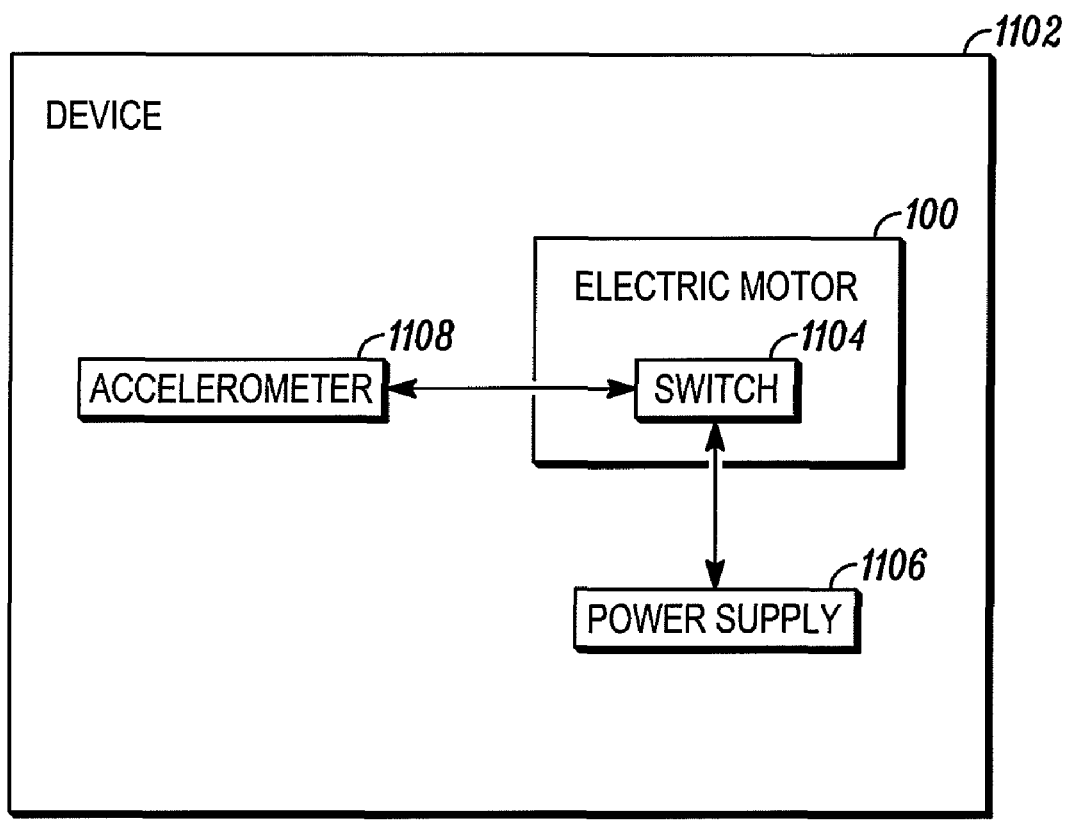
FIG. 11 illustrates a device where various embodiments of the present invention can be applied.

FIG. 11 illustrates a device 1102 where various embodiments of the present invention can be applicable. In at least one embodiment, the device 1102 can be a portable electronic device. Examples of the portable electronic device can include, but are not limited to, a laptop, a personal digital assistant (PDA) and a pager. In another embodiment, the device 1102 can be a radio frequency telephone. Examples of the radio frequency telephone can include, but are not limited to, a mobile phone and/or a cellular telephone. The device 1102 includes the electric motor 100, which includes an input switch 1104 for receiving power from a power supply 1106. The switch 1104 is coupled to an accelerometer 1108, which detects the free fall of the device 1102 by measuring acceleration of the device 1102. Examples of an accelerometer 1108 include, but are not limited to, a piezoelectric accelerometer and an electromechanical accelerometer. In at least some instances a piezoelectric accelerometer can be used to produce a measurable change in a voltage across a dielectric in response to varying amounts of mechanical stress, which can result from the acceleration of an associated mass being acted upon by the force of gravity.

The output of the accelerometer 1108 is coupled to the switch 1104. When the accelerometer 1108 detects the free fall of the device 1102, the power supply 1106 is decoupled from the electric motor 100 by the switch 1104. Upon the removal of power from the motor, the load connected to the electric motor 100 retracts. As a result, even if the device 1102 is dropped when the motor is active and the shaft is extended (i.e. power is currently being applied), the fall can be detected and power removed, such that the shaft 114 can retract, thereby increasing the chances that the shaft will be saved from getting bent or damaged.

Various embodiments of the present invention, as described above, provide the following advantages. In at least one embodiment, the method enables the lateral displacement of the shaft within the electric motor, when the motor is not in use or an acceleration of the device is detected, which might occur prior to an impact with a potential to break or deform. Consequently, when the device that includes the electric motor is dropped, the shaft connected to the electric motor will be or can be moved toward a retracted position, thereby reducing the chances that it might be bent under the impact associated with the weight at the end of the shaft.

While the present invention has been largely described in connection with an unbalanced mass, one ordinarily skilled in the art would appreciate that the present invention can also be used in instances when the motor is being used to rotate a balanced mass, e.g., a fan, used for cooling purposes, inside a laptop without departing from the teachings of the present invention. In such an instance, the fan can be operated by connecting the fan to an electric motor through a shaft. With similar effect to the unbalanced mass coupled to the motor via a shaft associated with producing a vibrational effect, the shaft associated with the fan and the motor can similarly be retracted when not in use and/or when the same has been detected as falling, thereby reducing the likelihood that the shaft may be damaged through the result of a jarring impact, and the weight at the end of the shaft.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims as issued.

What is claimed is:

1. An electric motor used in a device comprising:
   a stator comprising one or more stator conductors for carrying a current when power is applied;
   a rotor comprising one or more permanent magnets for producing a magnetic field, wherein the one or more stator conductors interact with the magnetic field when the power is applied to purposely generate a force acting upon the rotor relative to the stator having an axial component and a circumferential component; and
   a shaft connected to the rotor wherein the shaft travels along a rotor axis with the rotor in an axial direction from a rest position when the power is applied, under an action of the axial component of the force, and retracts when the power is removed under an action of a biasing force from a tension device when the axial component of the force is no longer present, and wherein the shaft rotates with the rotor under an action of the circumferential component of the force when the power is applied.

2. An electric motor of claim 1 wherein the one or more stator conductors are skewed relative to the rotor axis.

3. An electric motor of claim 1 wherein a vector direction of the magnetic field is skewed relative to a radial and an axial direction of the rotor.

4. An electric motor of claim 1 wherein the one or more stator conductors are skewed relative to the rotor axis and a vector direction of the magnetic field is skewed relative to a radial and an axial direction of the rotor.

5. An electric motor of claim 1 further comprising an unbalanced mass coupled to the shaft for producing vibration in the device during rotation.

6. An electric motor of claim 1 wherein the tension device is a spring.

7. An electric motor of claim 6 wherein the spring is located co-axial with the shaft between a rotor-body and a motor-housing, further wherein the spring is in a more compressed state when the power is applied, and the spring is in a less compressed state when the power is removed.

8. An electric motor of claim 6 wherein the spring is located co-axial with the shaft, on exterior and opposite end of the electric motor relative to an unbalanced mass between the end of the shaft and a motor-housing, further wherein the spring is in a more compressed state when the power is applied, and the spring is in a less compressed state when the power is removed.

9. An electric motor of claim 1 further comprising a bearing arrangement for supporting the traveling of the shaft in the axial direction.

10. An electric motor of claim 1 wherein the device is a portable electronic device.

11. An electric motor of claim 1 wherein the device is a radio frequency telephone.

12. An electric motor of claim 1 further comprising:
an input switch for providing an input power supply to the electric motor, wherein on detecting a free-fall of the device by an accelerometer coupled to the input switch, the input switch decouples the input power supply from the electric motor.

13. An electric motor of claim 1 wherein the electric motor is selected from the group comprising a Permanent Magnet Direct Current (PMDC) motor and a Switched Reluctance Motor (SRM).

14. An electric motor of claim 1 wherein the electric motor is incorporated in a vibrator assembly in a device, and the electric motor further comprises an unbalanced mass coupled to the shaft wherein the unbalanced mass rotates under the action of the circumferential component of the force on the rotor when power is applied.

15. An electric motor of claim 14 wherein a vector direction of the magnetic field is skewed relative to a radial and an axial direction of the rotor.

16. An electric motor of claim 14 wherein the one or more stator conductors are skewed relative to the rotor axis and the vector direction of the magnetic field is skewed relative to a radial and an axial direction of the rotor.

17. A method for controlling lateral positioning of a shaft within an electric motor during operation of the electric motor, the method comprising:
biasing a rotor within the electric motor in an axial direction towards a parked position due to a biasing force produced by a tension device where a magnetic field produced by one or more permanent magnets becomes misaligned with one or more stator conductors of a stator when power is applied to the electric motor;
applying power to the electric motor thereby producing a current in the one or more stator conductors, which interacts with the magnetic field of the one or more permanent magnets to purposely generate a force having an axial component and a circumferential component which acts upon the rotor relative to the stator; and
extending a rotor shaft, which is connected to the rotor, in an axial direction against the biasing force of the tension device due to the axial component of the purposely generated force, while the rotor shaft is rotated due to the circumferential component of the purposely generated force.

18. A method of claim 17 further comprising:
producing a vibratory force through the rotation of an unbalanced mass attached to the rotor, which rotates, as a result of the circumferential component of the purposely generated force.

19. A method of claim 17 further comprising:
removing power from the electric motor, wherein the axial component of the purposely generated force is allowed to dissipate, wherein the biasing force of the tension device causes the rotor to retract in the axial direction towards the parked position.

* * * * *